Figure 1:
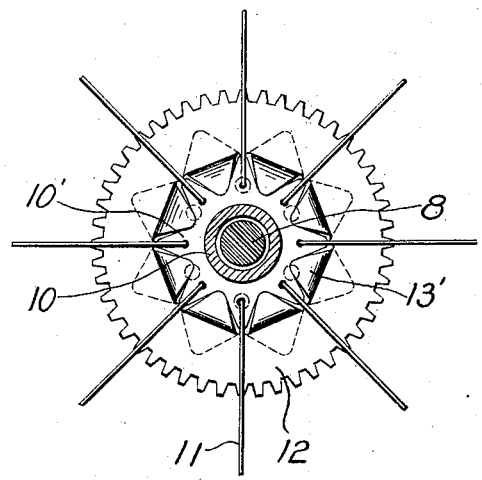

J. A. CRANDALL.
VEHICLE WHEEL.
APPLICATION FILED FEB. 25, 1908.

934,793. Patented Sept. 21, 1909.

UNITED STATES PATENT OFFICE.

JESSE A. CRANDALL, OF BROOKLYN, NEW YORK, ASSIGNOR OF ONE-THIRD TO E. B. SCHNEBLEY, TRUSTEE, OF BROOKLYN, NEW YORK, AND ONE-THIRD TO W. P. HAMPSHIRE, OF AQUEDUCT, NEW YORK.

VEHICLE-WHEEL.

934,793.    Specification of Letters Patent.    Patented Sept. 21, 1909.

Application filed February 25, 1908. Serial No. 417,710.

*To all whom it may concern:*

Be it known that I, JESSE A. CRANDALL, a citizen of the United States, residing at Brooklyn, in the county of Kings and State of New York, have invented certain new and useful Improvements in Vehicle-Wheels, of which the following is a specification.

My invention relates to improvements in vehicle wheels and particularly to a new and improved method for attaching sprocket or gear wheels thereto and comprehends in its construction the utilization of means whereby any desired gear or sprocket wheel may be attached to a vehicle wheel without the employment of bolts and the necessary weakening of the structure of the wheel.

My invention is fully illustrated in the drawings wherein—

Figure 2:
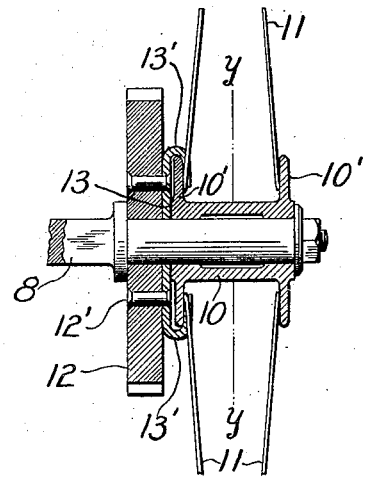

Figure 1 represents a fragmentary view of the ordinary construction of wire spoke wheel on the line y—y Fig. 2 showing the method of attaching a gear wheel thereto. Fig. 2 represents a central section of the same illustrating the facility with which the device may be applied to this particular form of wheel.

I have shown in the drawings an ordinary gear wheel 12 which is suitably riveted by means of rivets 12' to a serrated plate 13, the serrations 13' being arranged in such shape and form that they can easily be inserted between the spokes of the wheel and there bent down over the hub 10. In the present instance the hub is of spool-shaped form having flanges 10' to which the spokes 11 are attached in the usual manner and the combined device is slipped upon the axle 8 and secured thereto in any suitable manner.

To apply my device it is only necessary to force the gear wheel and its serrated plate close up to the hub and turn down the serrations 13' between the spokes, utilizing the spokes as a lock against any possible rotation of the gear wheel. It is obvious that the flange 10' of the hub can be made octagonal or of as many sides as are necessary to accommodate the number of serrations of the gear wheel plate, in which case when the serrations are turned downward they would hold rigidly against rotation on account of the polygonal arrangement of the flanges of the hub. It will also be perceived that gear wheels can be attached to wheels of the ordinary military type by shaping the serrations of the disk so that the same will fit between the spokes and be held in position thereby.

The great advantage of this device over and above devices of this nature usually employed is that the strain upon the gear wheel when transmitted to its locking mechanism is transmitted to the hub of the wheel and not to the spokes of the wheel so that there is less liability of undue strain upon any weak part by this construction.

Having described my invention what I claim and desire to secure by Letters Patent is:

1. In a vehicle, a fixed axle; a spoked wheel rotatable thereon; a gear wheel journaled on the axle adjacent to the said first named wheel; and a plate riveted to the inner side of said gear, said plate having radial projections turned inward through the spokes of the wheel and engaging therewith to rotate the wheel with the gear.

2. In a vehicle, a fixed axle; a hub having an inner flange projecting at right angles to the axle; wheel spokes engaging with said hub; a gear wheel journaled on the axle adjacent to the said hub; and a plate riveted to the inner side of said gear, said plate having radial projections turned inward through the spokes of the wheel and downward around the flange of the hub.

In testimony whereof, I have signed my name to this specification in the presence of two subscribing witnesses, this 21st day of February 1908.

JESSE A. CRANDALL.

Witnesses:
 FREDERIC B. WRIGHT,
 JOSEPHINE A. VERNON.